(12) United States Patent
Brandon et al.

(10) Patent No.: US 6,591,593 B1
(45) Date of Patent: Jul. 15, 2003

(54) ELECTRIC RIDING LAWN MOWER POWERED BY AN INTERNAL COMBUSTION ENGINE AND GENERATOR SYSTEM

(76) Inventors: Dennis Brandon, 5114 Woodland Hills Dr., Brentwood, TN (US) 37027; Allan Flack, 20203 Crowne Brook Cir., Franklin, TN (US) 37067

(*) Notice: Subject to any disclaimer, the term of this patent is extended or adjusted under 35 U.S.C. 154(b) by 0 days.

(21) Appl. No.: 09/694,646

(22) Filed: Oct. 23, 2000

(51) Int. Cl.$^7$ ............................................... A01D 34/64
(52) U.S. Cl. .......................................... 56/10.6; 56/10.8
(58) Field of Search ............................ 56/10.6, 10.2 G, 56/10.8, 11.1, 11.9, 17.1; 180/165, 900

(56) References Cited

U.S. PATENT DOCUMENTS

| | | |
|---|---|---|
| 411,196 A | 9/1889 | Huntington |
| 571,392 A | 11/1896 | Plass |
| 583,018 A | 5/1897 | Baker |
| 583,749 A | 6/1897 | Hertel |
| 585,251 A | 6/1897 | Bird |
| 607,318 A | 7/1898 | Worth |
| 632,278 A | 9/1899 | Plass |
| 654,716 A | 7/1900 | Cowles |
| 696,596 A | 4/1902 | Robinson |
| 725,860 A | 4/1903 | Morton |
| 968,521 A | 8/1910 | Baird |
| 1,147,669 A | 7/1915 | Avery |
| 1,214,643 A | 2/1917 | Boker |
| 1,227,016 A | 5/1917 | Sturm |
| 1,386,874 A | 8/1921 | Judson |
| 1,641,802 A | 9/1927 | Danly |
| 2,023,716 A | 12/1935 | Thompson |
| 2,647,025 A | 7/1953 | Deffenbaugh |
| 3,035,385 A | 5/1962 | Lill |
| 3,038,288 A | 6/1962 | Deptula et al. |
| 3,059,397 A | 10/1962 | Anderson et al. |
| 3,327,546 A | 6/1967 | Gordon et al. |
| 3,445,991 A | 5/1969 | Hanson et al. |
| 3,529,482 A | 9/1970 | Jackson et al. |
| 3,613,814 A | 10/1971 | Prien, Jr. |
| 3,631,730 A | 1/1972 | Hadler et al. |
| 3,667,304 A | 6/1972 | Puffer et al. |
| 3,706,363 A | 12/1972 | Niles |
| 3,892,446 A | 7/1975 | Rich, Jr. |
| 3,995,709 A | 12/1976 | Gil |
| 4,319,467 A | 3/1982 | Hegler et al. |
| 4,395,245 A | 7/1983 | Carlson |
| 4,407,517 A | 10/1983 | Neyer |
| 4,415,049 A | 11/1983 | Wereb |
| 4,498,552 A | 2/1985 | Rouse |
| 4,840,385 A | 6/1989 | Senft et al. |
| 5,353,578 A | 10/1994 | Irby et al. |
| 5,743,347 A | 4/1998 | Gingerich |
| 5,794,422 A * | 8/1998 | Reimers et al. ............... 56/11.9 |
| 5,822,960 A * | 10/1998 | Kitamura et al. ................ 56/7 |
| 5,857,315 A | 1/1999 | Keane |
| 6,026,634 A * | 2/2000 | Peter et al. .................. 180/6.5 |
| 6,109,010 A * | 8/2000 | Heal et al. .................... 56/10.5 |

FOREIGN PATENT DOCUMENTS

DE 10027531 A1 * 1/2001

* cited by examiner

*Primary Examiner*—Robert E. Pezzuto
*Assistant Examiner*—Meredith Petravick
(74) *Attorney, Agent, or Firm*—W. Edward Ramage; Dinsmore & Shohl LLP

(57) ABSTRACT

An electric riding mower which integrates an electric generator and inverter driven by an internal combustion engine, an operator/drive with an electric motor driving each of the two wheels and a mowing deck that has electric motors driving the cutting blades and a motor for raising/tilting the deck is disclosed. The generator is mechanically driven by the output shaft of an internal combustion engine to generate the electrical power for energizing the electric motors and the inverter. A computer in the master controller communicates with each of the controllers for the motors and the generator/inverter and processes the data necessary to co-ordinate the drives.

20 Claims, 9 Drawing Sheets

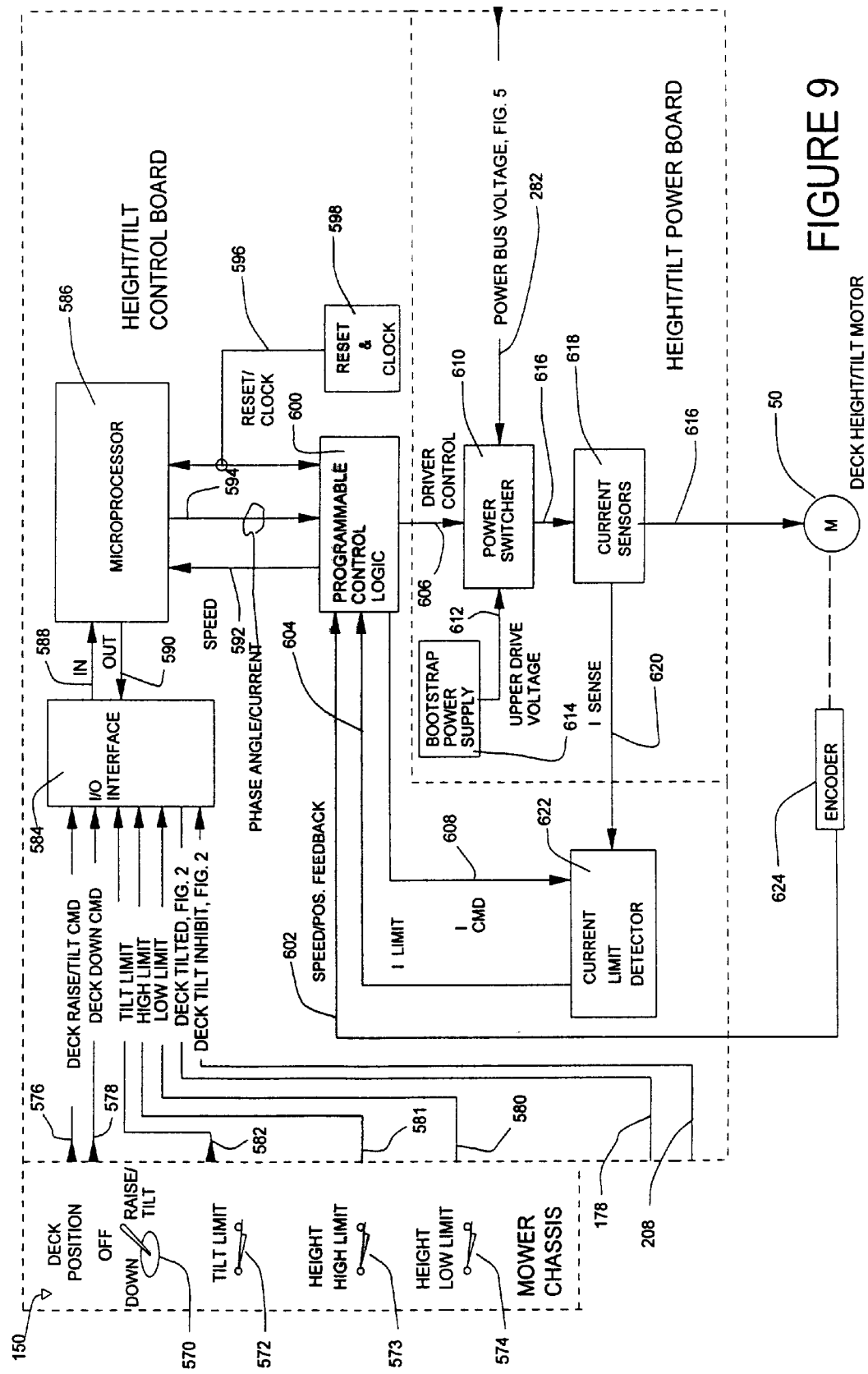

ELECTRIC RIDING LAWN MOWER POWERED BY AN INTERNAL COMBUSTION ENGINE AND GENERATOR SYSTEM

BACKGROUND OF THE INVENTION

This invention relates generally to riding lawn mowers, and more particularly to the manner of generating, distributing, and controlling electrical power from an electrical generator driven by an internal combustion engine to power computer-controlled electric motors. The motors are used as the traction drives, blade drives, and lifting/tilting control of the mower deck in riding lawn mowers. An inverter provides power to on-board vehicle attachments and external electrical equipment, and may be inhibited during the running of the drive motors.

Riding lawn mowers exist today in several configurations and are purposefully built to meet the needs related to the tasks they are expected to perform. They require a power source that is typically directly or indirectly mechanically linked to the drive wheels for traction and may utilize a mechanical power take off connection provided for powering onboard attachments and externally attached devices.

Drive power trains have typically used drive axles, chain/sprocket drives, belt/sheave drives, manual gear-selection transmissions, hydrostatic transmissions, differential gears, and other mechanical parts in varying combinations. Steering and speed control techniques vary between the different types of mowers. Most use a mechanical differential in the drive train to balance the torque applied to the driven wheels so that the wheels can rotate at different speeds when they are required to make a turn. Some are capable of zero radius turning. The power sources for the mowers have been either battery-powered electric motors or internal combustion motors. Both of these sources have shortcomings when they are used separately in a drive system.

Undesirable features of battery-powered motor driven mowers have been the battery charge cycle, battery life, battery weight, battery cost, space required for the batteries, and low torque from the motors at low speed. Many tasks cannot be completed without the batteries having to be recharged due to the length of operational time required or due to the batteries not being fully recharged. Additionally, the charging time required can be excessive. Furthermore, the weight of the batteries also adds to the load on the drive and a large space is required on the mower for mounting the batteries. Thus, batteries have not been practical for real world applications, and this is especially true on the larger commercial mowers.

The internal combustion engine has features that detract from its use in directly driving a transmission and differential. Low output torque at low speed and decreasing torque beyond an optimum speed somewhere below maximum speed occurs in this engine. A typical engine will have a range of speeds up to 3300 RPM but torque efficiency will be maximized between 2500 and 2800 RPM. The loss of efficiency increases the thermal dissipation in the engine which causes fatiguing and failure of engine components. At low speeds, excessive vibration of the engine is also a problem. Continual operation of the internal combustion engine at its most efficient speed is desirable.

The blades on mowers are limited in the speed of the blade tips by the ANSI standards for mowers. The speed of the blades on existing mowers must be set at ninety percent or less of the maximum ANSI speed because the blade speed on a mower that has an all-mechanical system driven by an internal combustion engine will have a speed variation of plus/minus ten percent of the nominal set speed. On an electrically-driven blade that is electronically controlled, the blade speed can be very closely regulated. This precise speed regulation makes possible the operation of the blades at one hundred percent of the maximum ANSI speed.

Advances in electric generators and motors have increased their efficiencies to the 80–90% range and improved their reliability. The different types of electric motors are inverter-powered AC induction, brush-less DC, and switched reluctance motors. All of these types of motors have excellent controllability with state of the art controllers, which are of similar complexity. However, the prior art has failed to take advantage of these advances and provide improved riding mowers.

With the advent of solid-state power-switching devices such as MOSFETs (metal oxide semiconductor field effect transistors), IGBTs (insulated-gate bipolar transistors), and microprocessors, the electronic controls for generators and motors that were very complex and expensive in the past, have become economically practical. Today, the electric generator/motor drive provides the flexibility in control and the ruggedness in assembly needed for an electric motor-driven riding mower, especially one intended for commercial usage.

Portable electrical power sources have usually been either alternators or DC generators powered by rechargeable batteries or an internal combustion engine. Batteries are impractical to deliver enough power for a large horsepower mower or for its attachments. Both the generator and alternator require speed regulation of the engine to control their output. In the case of the alternator, its output frequency was determined by the speed of the driving engine. An inverter with electronic control on the output of a DC generator of the switched reluctance type can synthesize a sine wave power output with regulation of amplitude and frequency and a power efficiency near ninety percent. This improvement is not known to have been utilized on a riding mower.

Thus, what is needed is an apparatus and method for generating, distributing, and controlling electrical power to drive motors on the driven wheels, cutting blades, and the lifting/tilting of the mowing deck on a riding mower with output power available in a standard recognized format.

SUMMARY OF THE INVENTION

This invention relates to the apparatus and method of generating, distributing, and controlling electrical power to drive motors on the driven wheels, cutting blades and the lifting/tilting of the mowing deck on a riding mower. The mower drive system integrates 1) a high-efficiency switched reluctance electric generator/inverter driven by an internal combustion engine, 2) high-efficiency switched reluctance electric motors, 3) speed reduction gearboxes and 4) power controllers. The battery used for starting the internal combustion engine supplies power to the master controller and other low voltage circuitry.

An improved innovative mower drive system has been developed with an electric generator driven by an internal combustion engine and an electric motor that provides high output torque up to its base speed. The generator supplies electrical power through a motor controller to the motor/gearbox on each driven wheel, the lift/tilt control, and blade motor on each driven blade.

Thus, the present invention discloses an electric riding mower which integrates three sections: 1) an electric generator/inverter section driven by an internal combustion engine, 2) an operator/drive section with an electric motor driving each of the two wheels and 3) a mowing deck that has electric motors driving the cutting blades and a motor for raising the height/tilting of the deck. The generator is mechanically driven by the output shaft of an internal combustion engine to generate the electrical power for energizing the electric motors and the inverter. A computer in the master controller communicates with each of the controllers for the motors and the generator/inverter and processes the data necessary to co-ordinate the drives. The generator/inverter controller adjusts the output of the generator and inverter as an integral part of the mower or as a stand-alone power source. Each controller contains a control board and one or more power boards. The two wheel drives and the lifting/tilting drive of the mower deck each have individual controllers. The cutting blades on the mower deck have a common controller. The speed and torque of each of the motors in the drive system is controlled by its controller. The speed input signal for the wheel drive motors can be analog signals that come from sources such as a joystick, a potentiometer mounted on a steering wheel, dual sticks, a control panel, a foot pedal or remote signals from a remote control device. Position/speed detectors on each motor and the generator send signals back to their respective controllers for closed-loop control of the generator and of the motors. The generator supplies the DC voltage to the power board for each motor as commanded by its controller. The rotor of each wheel drive motor is connected to a gearbox for speed reduction and increased torque that is applied to the wheel mounted on the output shaft of the gearbox. With independent control of each wheel drive, the mower can make zero radius turns. The generator also supplies DC power to the input of an inverter that has an output to standard electric utility low voltage AC outlets that can be used to power auxiliary equipment when the drive motors are de-energized.

BRIEF DESCRIPTION OF THE DRAWINGS

FIG. 9 is a block diagram of the deck height adjust/tilt control system.

DESCRIPTION OF THE PREFERRED EMBODIMENTS

Figure 1:
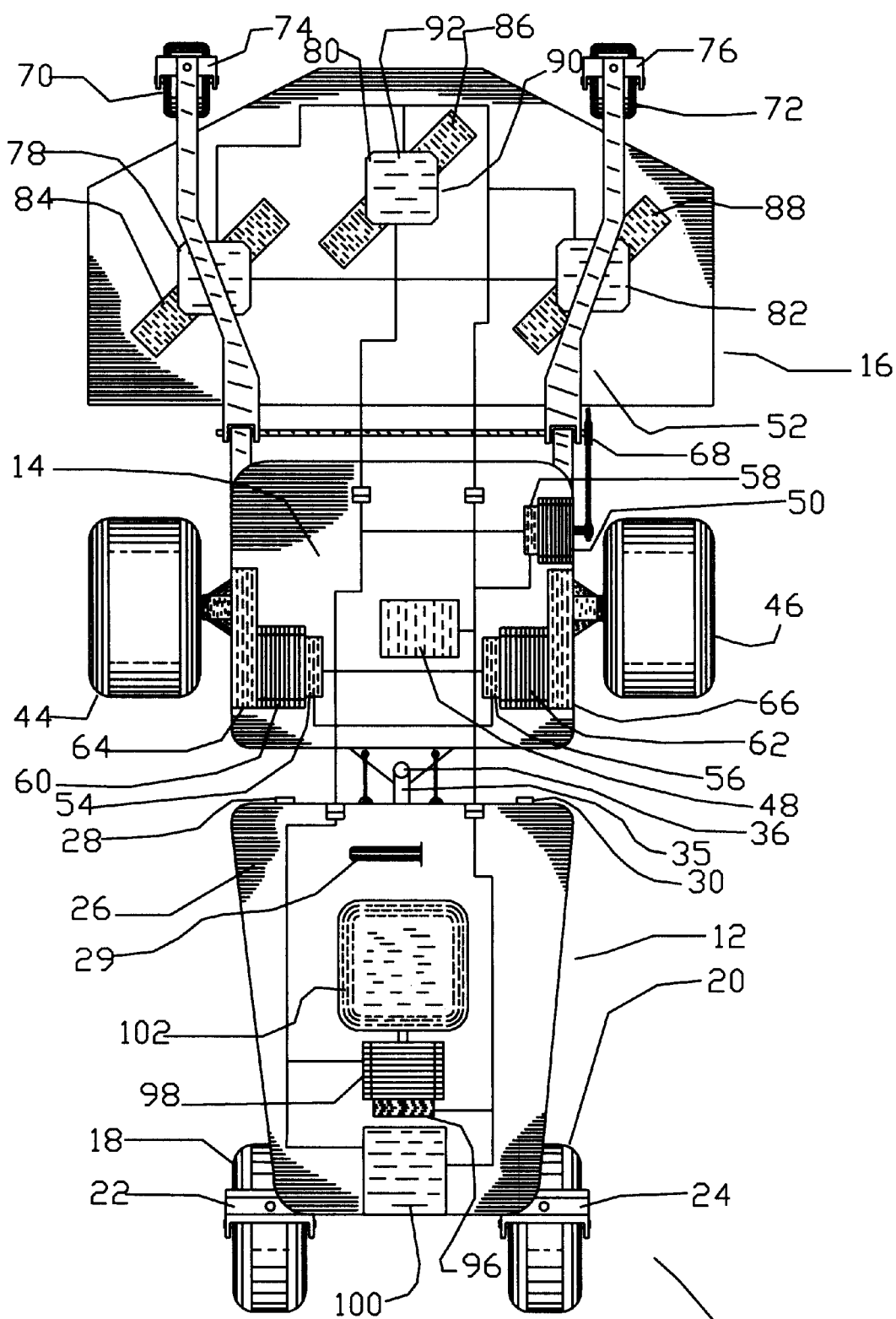
FIG. 1 shows a commercial-type lawn mower in three sections that has a drive system, which embodies the invention.

FIG. 1 shows a commercial-type riding lawn mower 10, that is composed of three detachable sections: 1) an electric generator/inverter 12, 2) an operator/drive section 14 and 3) a three-blade mowing deck 16. The sections 12, 14, 16 are connected mechanically and electrically to operate as a complete riding lawn mower 10.

The generator/inverter section 12 in FIG. 1 has two non-driven rear wheels 18, 20, each in a swiveling stirrup 22, 24, attached mechanically to the body and section frame 26 as casters. The front of the generator/inverter section 12 is supported on two feet 28, 30, one on each side, that are lowered when the feet release lever (not shown) is in the down position.

To attach the generator/inverter section 12 to the operator/drive section 14, the generator/inverter section hitch arm 35 is aligned with the ball hitch 36 on the rear of the operator/drive section and lowered over the ball 36 and latched. The operator/drive section 14, which is the central component of the mower 10 shown in FIG. 1, has driven wheels 44, 46 for moving the mower 10, the electronic master controller 48 and the height adjustment and tilting motor 50 for the mowing deck 16. Each driven wheel 44, 46 has a separate controller 54, 56 with separate speed input signals so that they are independently controlled by the operator.

The master controller 48 receives signals from each motor controller 54, 56, 58 for digital processing and sends enable/inhibit or operation signals to each motor controller 54, 56, 58 in the mower system to co-ordinate the operation of the mower 10. The height/tilt motor 50 can be operated to drive a chain/sprocket drive 68 to tilt the mowing deck 52 for maintenance. In the preferred embodiment, the tilt operation of the height/tilt motor 50 is only operable when the mower blades (not shown) and the driven wheels 44, 46 are not energized and the brake (not shown) is engaged.

The master controller 48 in FIG. 1 is part of a distributed control system where the master controller 48 communicates with the controllers 54, 56, 58, 92 for the generator 98, inverter 100 and motors 50, 60, 62, 78, 80, 82 in the mower drive system. If a seat switch (not shown) is used on the mower 10 instead of seat belts (not shown) and there is not enough pressure on the seat to activate the seat switch, or the brake (not shown) is on, or the deck 16 is tilted, the master controller 48 inhibits the controllers 92, 54, 56 for the cutting blades 84, 86, 88, left wheel 44, and right wheel 46 and enables the controllers for the inverter 100 and the tilting 58 of the deck 16. When there is enough pressure on the seat to activate the. seat switch, the brake is off, and the deck 16 is not tilted, the master controller 48 enables the controllers 92, 54, 56 for the cutting blades 84, 86, 88, left wheel 44, and right wheel 46. The master controller 48 prevents the controller 58 for the height adjust/tilt control motor 50 from tilting of the deck 16 when either the cutting blades 84, 86, 88 or the driven wheels 44, 46 are operating. The controller 92 for the cutting blades 84, 86, 88 may be inhibited when the driven wheels 44, 46 are rotating in the reverse direction. The controllers 54, 56, 58, 92 for all of the motors 60, 62, 50, 78, 80, 82 and the inverter 100 are inhibited when the generator output voltage is out of its specified operating range. The master controller 48 receives digital speed signals from the controllers 54, 56 for both the left wheel 44 and the right wheel 46 that are processed in the master controller 48 to produce an analog speed signal or a digital speed signal. The analog speed signal may be the input to an analog speed indicator 158 on the mower 10. The digital speed signal may also be used as an input to a digital speed indicator 160 on the mower 10.

In FIG. 1, the mowing deck section 16 mechanically and electrically attaches to the front of the operator/drive section 14. Two wheels 70, 72 in swiveling stirrups 74, 76 are mounted mechanically to the front of the deck frame 52 as casters. Three mower blades, left blade 84, center blade 86, and right blade 88, are driven by three motors 78, 80, 82 that have a speed selector (not shown) operating through blade controller 92 and the master controller 48 by which the operator can select the rotating speed to the maximum speed set point.

The master controller 48 in the operator/drive section 14 receives inputs from each of the operator interfaces 150, communicates with each of the controllers 54, 56, 58, 92 for the motors 50, 60, 62, 78, 80, 82, the controller 96 for the generator 98, and the inverter 100 and processes the data necessary to co-ordinate the drives. The firmware in the master controller 48 implements the control scheme with control commands and enable, inhibit or operation signals to the controllers 54, 56, 58, 92, 96. The speed indicators 158, 160 for the operator receive also their signal from the master controller 48.

The internal combustion engine 102 in the generator/inverter section 12 in FIG. 1 is the power source for the generator 98. The engine output shaft 104 is mechanically connected to the rotor of the generator 98. The engine 102 will operate at a constant speed between 2500 RPM and 2800 RPM, the speed range where the engine 102 operates most efficiently, to drive the generator 98.

The switched reluctance type generator 98 is directly driven by mechanically connecting it to the engine output shaft 104. The generator 98 has an encoder (not shown), either Hall sensors or optical sensors, on the rotor that sends a position/speed signal to the generator controller 96 that must know the location of the rotor for control of commutation in the generator 98. The output of the generator 98 is monitored by the master controller 48 to determine the level of excitation required from the generator controller 96 to maintain the correct output level. The output of the generator 98 is electrically supplied to each of the motor controllers 54, 56, 58, 92 and to the input of the inverter 100.

The generator controller 96 controls the generator output by controlling the electrical excitation to the stator windings of the generator 98 from a solid-state power board. The generator 98 supplies power to each wheel drive motor 60, 62 that directly drives a double reduction gearbox 64, 66 mounted to each driven wheel 44, 46 in the operator/drive section 14 of the mower 10 and to the motors 78, 80, 82 for the blade drives and the lifting/tilting control motor 50 for the mowing deck 52. In this drive configuration, the internal combustion engine 102 can be run continually at the speed where it is most efficient.

The generator output is regulated through its electrical excitation that comes from the generator controller 96. A generator output sense signal is algebraically summed with an output set-point signal from the master controller 48 with the resultant error signal digitally processed by the generator controller 96 for any necessary increase or decrease in the excitation to the generator 98 to correct the generator output level. An encoder (not shown) on the rotor (not shown) sends a stream of pulses back to the generator controller 96 where it is processed to determine rotational position of the rotor (not shown). The rotational position is used by the generator controller 96 to synchronize the switching of the DC excitation to the phase windings on the stator to the angle of rotation of the rotor. The synchronization is necessary for the operation of the switched reluctance generator.

The generator controller 96 controls the frequency and output voltage level of the inverter 100 by varying the pulse width and frequency of the pulses from a programmable logic device to the control input of the H-bridge that produces the power output. A smoothing low-pass filter converts the pulses to a sine wave output.

The inverter 100 can be used either during the mower operation or as a stand-alone power source after the support feet 28, 30 on the front of the generator/inverter section 12 have been lowered to the ground by moving the hand lever 29 to the locked down position. The generator/inverter section 12 can then be unhitched from the remaining mower sections 14, 16 and started independently of the other sections 14, 16. Low voltage AC power is available from the inverter 100 through standard electric utility outlets (not shown) for emergency power or to power auxiliary electrical equipment.

Each motor 50, 78, 80, 82 in FIG. 1 is electrically powered by the output of a controller 58, 92, with solid-state power switching devices controlling the electrical drive level for the motor 50, 78, 80, 82. These motors 50, 78, 80, 82 are adapted to provide a mechanical motion for use in driving the mower 10, blades 84, 86, 88, or positioning the deck 52. The acceleration of the motor 50, 60, 62, 78, 80, 82 is controlled by ramping up a speed set-point signal in the controller 58, 92 that is a reference for speed regulation. An encoder, either Hall sensors or optical sensors, on the output shaft of each motor 50, 78, 80, 82 sends back a stream of pulses that is processed by the controller 58, 92 to determine the motor speed and the rotational position of the rotor. The speed signal is algebraically summed with a speed set-point signal with the resultant error signal digitally processed by the controller 58, 92 which makes any necessary increase or decrease in the power to the motor 50, 78, 80, 82 until the speed is equal to the speed set-point. The rotational position is used by each of the controllers 58, 92 to synchronize the switching of the DC voltage to the phase windings on the stator to the angle of rotation of the rotor within each motor 50, 78, 80, 82. The synchronization is necessary for the operation of the switched reluctance motors.

To begin implementation of the combined combustion and generation system of the present invention, a comparison of different motors and generators was conducted to determine the best type for each application on this mower. The types of motors considered were inverter-powered AC induction, brush-less DC and switched reluctance motors. Criteria for the selection were controllability, efficiency, reliability, input speeds, output torque at all speeds, size, construction, thermal management, noise, maintainability, ruggedness and cost. All of these types of motors have excellent controllability with state of the art controllers, which are of similar complexity. Controllers for both AC induction motors and brush-less motors have power-switching devices that can be damaged by "shoot-through." "Shoot-through" is a high current that results from a short circuit across the power supply when both the high-side switch and the low side switch are on at the same time. "Shoot-through" cannot occur in switching devices of a switched reluctance controller because the phase windings of the motor are always between the switches. Switched reluctance motors produce maximum torque from zero speed to base speed without exceeding thermal limits due to all of the motor heat being dissipated in the stator which is the only part of the motor with coil windings. The lack of any windings on the rotor and the thermal transferability of the stator make possible a smaller size motor with simpler construction than the other two types. This simple construction reduces the maintenance costs for this type because only the rotor bearings will require servicing or replacement. The switched reluctance motor is less expensive than brush-less DC motors, which require rare earth magnets on the rotor. Due to the absence of magnets in the switched reluctance motor, demagnetization of magnets is not a concern as it is in brush-less motors and some other types. The torque ripple in the switched reluctance motor may make it noisier than both of the other two types but in an outdoor application the noise is not objectionable. The switched reluctance generator does not require a fixed speed as is required by an AC generator. The switched reluctance motors and generators were selected to be in this mower drive system because of their ruggedness due to their simple construction, lower mass for the same horsepower, torque/speed characteristics, good thermal transfer and cost of manufacturing. The motor efficiency, high torque, and ruggedness will improve the performance of the cutting blade drive.

Switched reluctance motors 60, 62 are mounted through gearboxes 64, 66 to the driven wheels 44, 46. Each drive motor 60, 62 is controlled by its individual controller 54, 56 that receives an enable signal from the master controller 48 and sends an inhibit signal back to the master controller 48 when the drive wheels 44, 46 are energized to prevent the tilting of the deck 52 and to possibly prevent the outputting of voltage from the inverter 100 to the outlets for attachments. The motors 60, 62 have encoders, either Hall sensors or optical sensors, on the rotors that send position/speed signals to their respective controllers 54, 56 where the signals are processed to determine the speed and position of the rotors. The motors 78, 80, 82 on the mower blades 84, 86, 88 connect directly to the blades 84, 86, 88. The motor 50 for lifting/tilting is connected via a mechanical linkage 68, shown as a sprocket/chain system to the mowing deck 52.

The controller 54, 56, for each of the wheel drive motors 60, 62, is microprocessor-based and controls the torque and velocity of its respective motor 60, 62. The controller 54, 56 accepts speed/direction control signals as varying DC voltage levels from a joystick, dual sticks or potentiometers mounted on a foot pedal, control panel, steering wheel or a remote location. A digital input signal from a digital device such as a computer or an encoder can also be accepted by the controller for speed control. Pulses from a position/speed sensor on the rotor of each motor 60, 62 is fed back to the controller 54, 56. For each motor 60, 62 the position data is used for commutation control in the phase outputs. In an outer (speed) control loop, the stream of pulses is used by the controller 54, 56 to determine the speed of its motor 60, 62 and to compare the speed to the speed set-point for the motor 60, 62 to determine if a speed correction signal is required to increase or decrease the power signal to that motor 60, 62. In an inner (current) control loop, a current signal for the motor 60, 62 is detected and sent back to the controller 54, 56 where it is compared to a current set point to determine if the current should be increased or decreased to the motor 60, 62. Each motor 50, 60, 62, 78, 80, 82 is controlled in this manner.

The double reduction gearbox 64, 66 mounted on the output shaft of the drive motor 60, 62 is a parallel shaft double reduction gearbox for a 30:1 reduction ratio. Torque is increased in the drive axle by the gear ratio in the gearbox 64, 66. The gearbox contains parallel shaft double reduction gears to provide a 30:1 speed reduction. Due to tooth deflection as the teeth of the gears mesh, the gears may be noisier than some other types such as planetary gears but in this application the noise is not objectionable. The cost of the selected gearbox 64, 66 is considerably less costly than other types and is widely used in many applications. The output shaft of the gearbox 64, 66 is the drive axle for its driven wheel on the mower 10.

In this invention, the wheel drive motors 60, 62 can operate in a forward direction or a reverse direction. The direction of rotation for each motor 60, 62 is controlled independently of the other wheel drive motor 60, 62. The controller 54, 56 for each motor 60, 62 can command a reversal of direction for each wheel through a software generated command or a signal from a reverse/forward signal generated on the steering wheel, a control panel, a joystick, dual sticks or a remote location. This mode of control provides for zero radius turning for the mower 10.

The wheel drive motors 60, 62 under most operational conditions will require power from the generator 98 and controllers 54, 56. However, when the mower 10 is travelling down an incline or decelerating, the motors 60, 62 will regenerate back through the controllers 54, 56 and the generator 98 into the source 102, an internal combustion engine 102. This regeneration will create a force that resists the rotation of the generator 98 and engine 102 and thus applies an increased amount of load on the internal combustion engine 102. The engine 102 will operate against the increased load and oppose the gravitational forces on the mower 10 much like downshifting a transmission on an automobile or truck when traveling down a hill. The regenerative braking can also be accomplished by dissipating the regenerated electrical energy into a resistive load, storing it in the bus capacitors 394 or recharging a battery 396. This braking is needed to slow down or stop the mower 10 in a reasonable amount of time and distance.

The implementation of an optional method of controlling the acceleration and deceleration of the mower can be accomplished with acceleration/deceleration curve data in a table stored in the on-board memory in the microprocessor of the controller for each driven wheel 44, 46. The acceleration of the mower 10 will follow the curve programmed into the table to the set speed in a predetermined amount of time. Any change in running speed, increase or decrease, will be controlled by the values in the table. Different rates of change can exist for acceleration and deceleration in the forward direction. The acceleration and deceleration in the reverse direction can also have different rates of change.

The speed of the mower 10 can be reduced as it is being steered into a curve so that the mower 10 does not tip over. The speeds of the two driven wheels are monitored by the master controller 48 to determine whether the mower is traveling into a turning radius at a speed that could be hazardous. If this condition exists, the master controller 48 will transmit a speed correction signal to one or both of the controllers 54, 56 for the driven wheels 44, 46. All movements can be made in a safe manner either by limiting the speed of the outer wheel or by the speed of the mower being reduced when an unsafe turn is being attempted. Other speed control modules may be added to improve the safe operation of the mower under different conditions. These conditions include the traveling of the mower at an acute angle to the horizon.

The blade motors 78, 80, 82 on the blade drives are inhibited from operating when the deck 52 is tilted and may be inhibited when the mower 10 is moving in the reverse direction. The lifting/tilting motor 50 that drives a mechanical linkage 68 for adjusting the deck height lifting or tilting the mower deck 52 is inhibited from raising the deck above a height high limit position when the blades 84, 86, 88 are operating or the mower 10 is moving. This position may be monitored by a maximum height position switch 452 or may be integrated into the control of the lifting/tilting motor 50.

Figure 7:
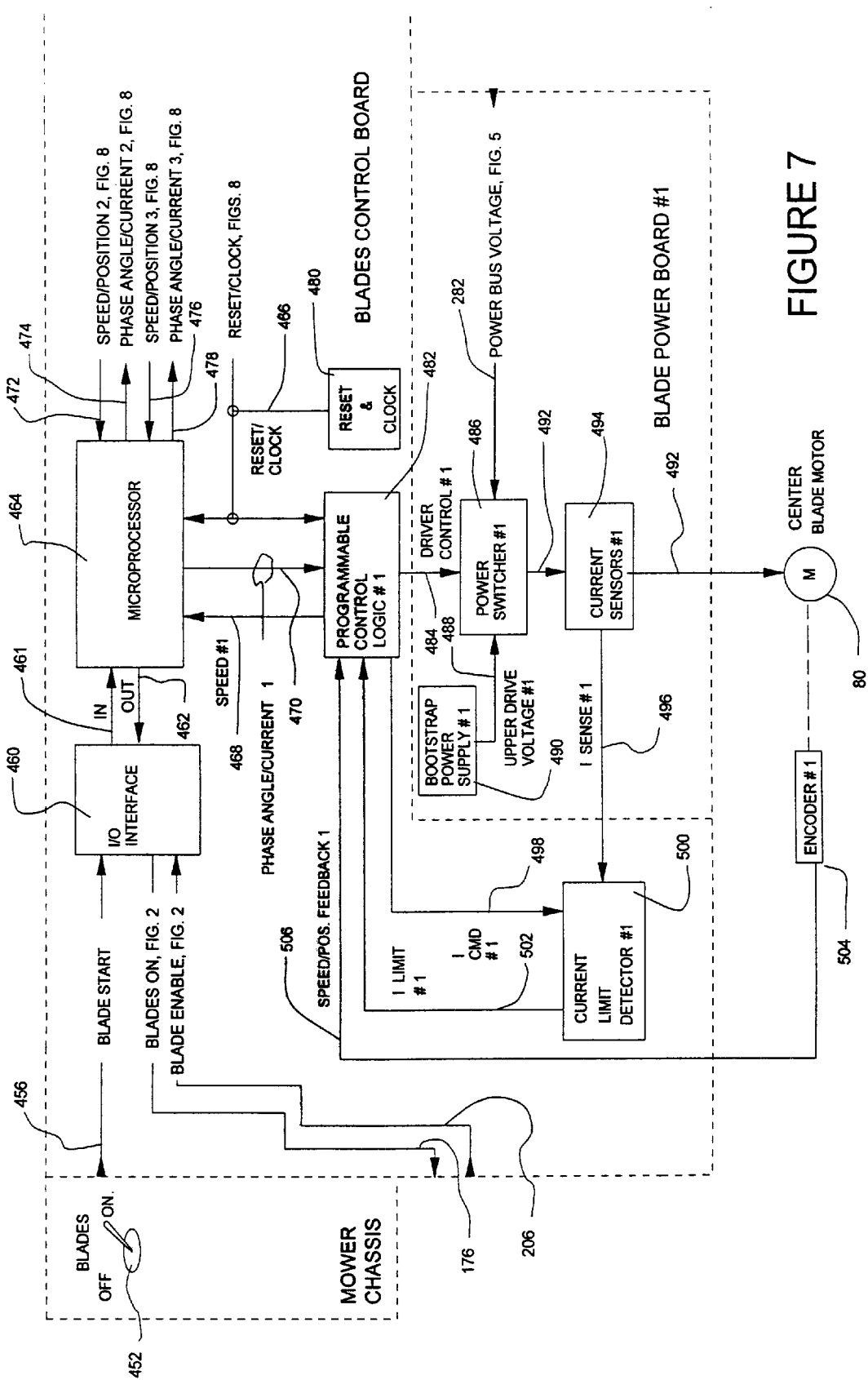
FIGS. 7 and 8 are block diagrams that show the drive control system for the deck cutting blades.
Figure 8:
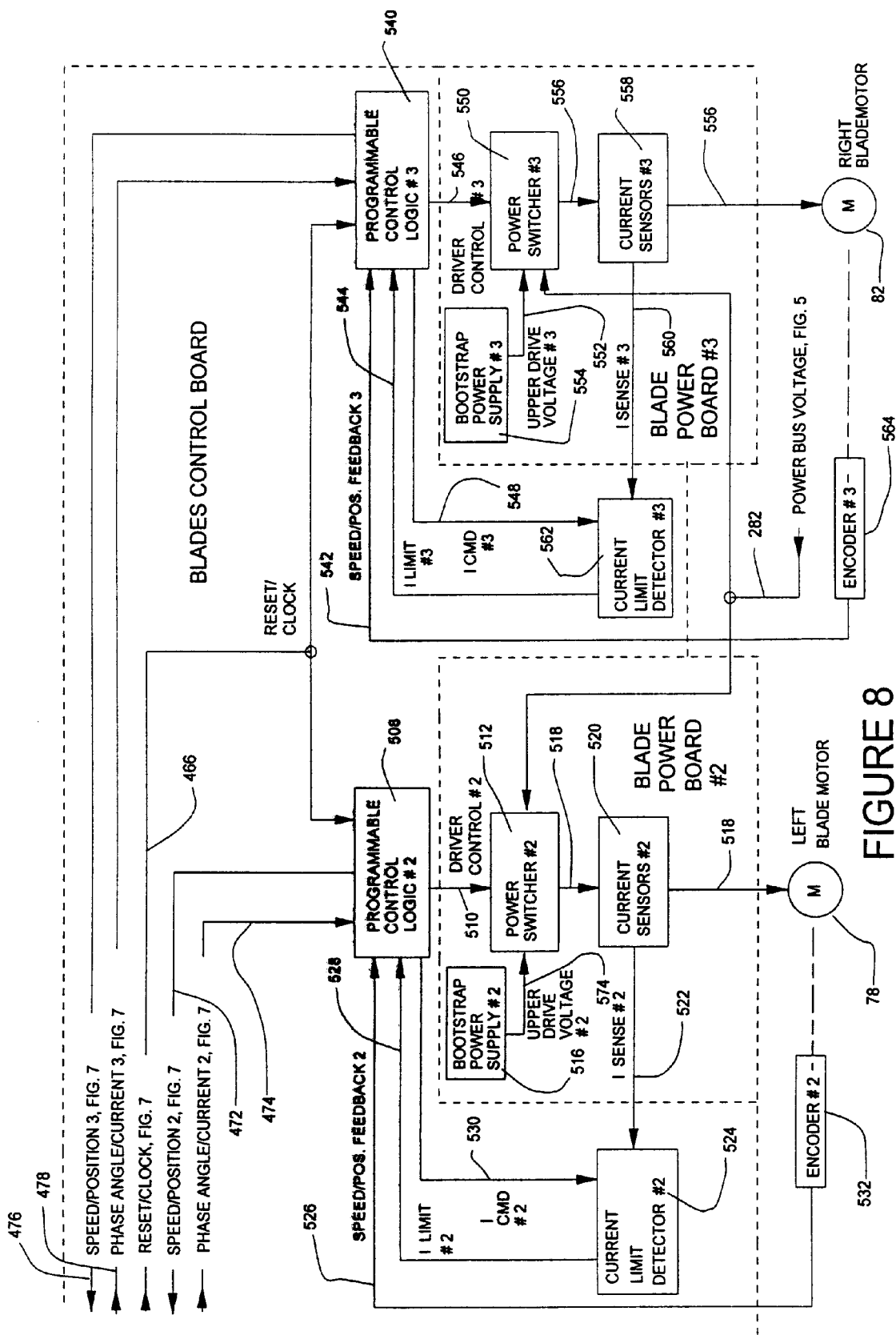

The mowing deck 52 has three motors: the center blade motor 80 in FIG. 7 and the left blade motor 78 and right blade motor 82 in FIG. 8. The motors 78, 80, 82 have a common controller 92 with a power board for each individual motor 78, 80, 82. The speed is set in the firmware of the controller 92 to a speed that does not exceed the maximum speed set by the ANSI standards. The blade motors 78, 80, 82 are energized by the controller 92 and the power boards when the blades off/on switch (not shown) is placed in the on position and the blade enable signal 206 from the master controller 48 is present. A blade on signal is sent to the master controller 48 to inhibit the tilting of the deck 52 and may inhibit the operation of the inverter 100.

The height/tilt control motor 50 adjusts the height of the deck 52 between the height low limit and the height high limit and mechanical stops or tilts the deck 52 for maintenance. When the mower 10 is not moving and the blades 84, 86, 88 are not energized, the tilting is accomplished by raising the deck 52 until it hits the mechanical stops (not shown) which will start the tilting of the deck 52 toward 90 degrees to horizontal until the deck position switch is returned to the off position or the tilt limit switch is activated. When the mower 10 is operating, the travel of the height adjust/tilt control is limited to the range from the height low limit to the height high limit set by the mechanical stops and limit switches.

FIGS. 2 through 9 show the schematic representation of the circuitry for the connections for the master controller board 148, left motor control 250, right motor control 300, generator control 348, inverter control 410, blade control 451, and the tilt control 569.

Figure 2:
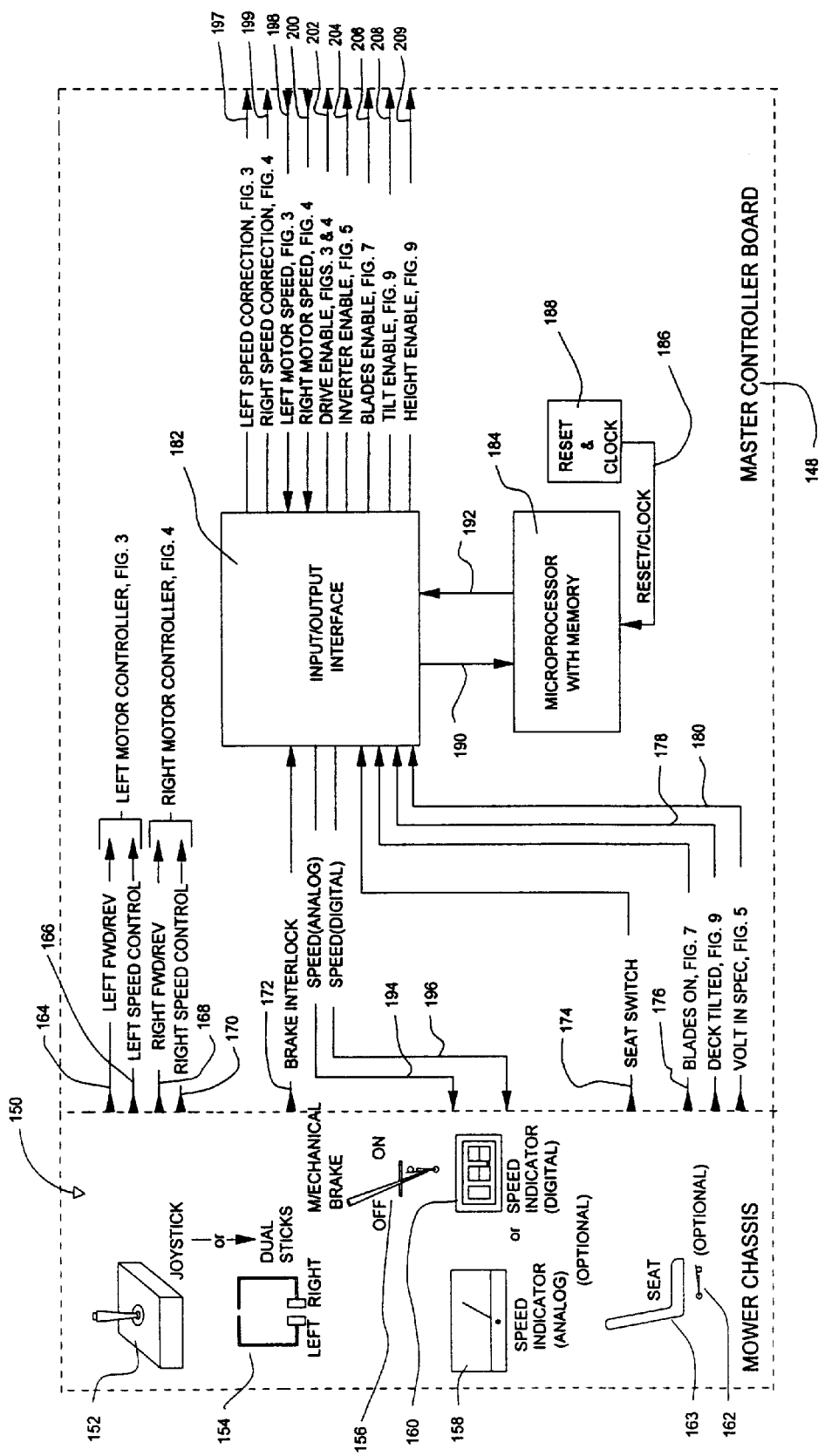
FIG. 2 is a block diagram of the master controller that controls and coordinates the individual drives in the mower system.

FIG. 2 shows a block diagram of the master controller board 148 for the master controller 78 that controls and co-ordinates the generator 98, the individual motors 50, 60, 62, 78, 80, 82 and the inverter 100 in the mower system. Operator interface devices 150, illustrated as a joystick 152, dual sticks 154, brake switch 156, analog speed indicator 158, digital speed indicator 160, and seat occupancy indicator 162 for a seat 163 are electrically connected to the master controller board 148. While a limited number of operator interface devices 150 are shown, this is not meant to limit this invention and these interfaces and their functions may be removed and other operator interface devices 150 that are well known in the art, such as steering wheel, brake pedal, and accelerator pedal may also be utilized in this invention. The operator interfaces 150 should provide a left forward/reverse signal 164, a left speed control signal 166, a right forward/reverse signal 168, a right speed control signal 170, a brake interlock signal 172, a seat occupancy signal 174, a blade rotation signal 176, a deck tilted signal 178, and a voltage input signal 180.

Figure 3:
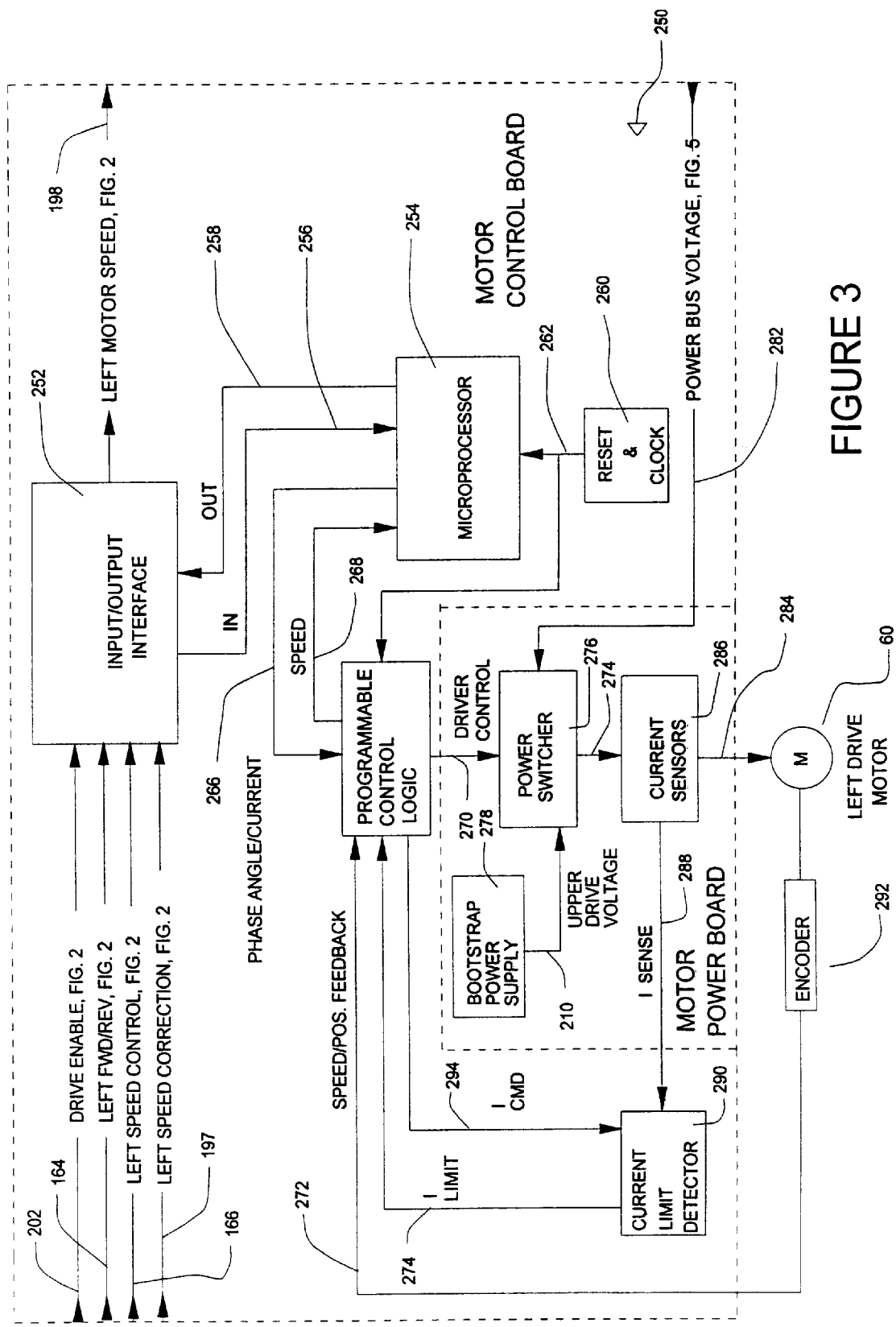
FIG. 3 is a block diagram of the left wheel drive control system.

The left forward/reverse signal 164 and left speed control signal 166 may be provided directly to the left motor controller shown in FIG. 3. The right forward/reverse signal 168 and right speed control signal 170 may be provided directly to the right motor controller shown in FIG. 4. The brake interlock signal 172, seat occupancy signal 174, blade rotation signal 176, deck tilted signal 178, and voltage in specification signal 180 are input into an input/output interface 182.

The input/output interface 182 communicates through microprocessor input signals 190 and microprocessor output signals 192 with a microprocessor 184 with associated memory (not shown) and reset/clock signals 186 from reset/clock inputs 188 as is well known in the art of computer controllers. The input output interface 182 provides feedback signals for the operator such as an analog speed signal 194, and/or a digital speed signal 196, and also provides for communication with the left and right motor controllers 54, 56 for the left motor speed signal 198, the right motor speed signal 200, left speed correction 197, right speed correction 199, the drive enable signal 202, the inverter enable signal 204, the blade enable signal 206, height enable signal 209 and the tilt enable signal 208.

Figure 4:
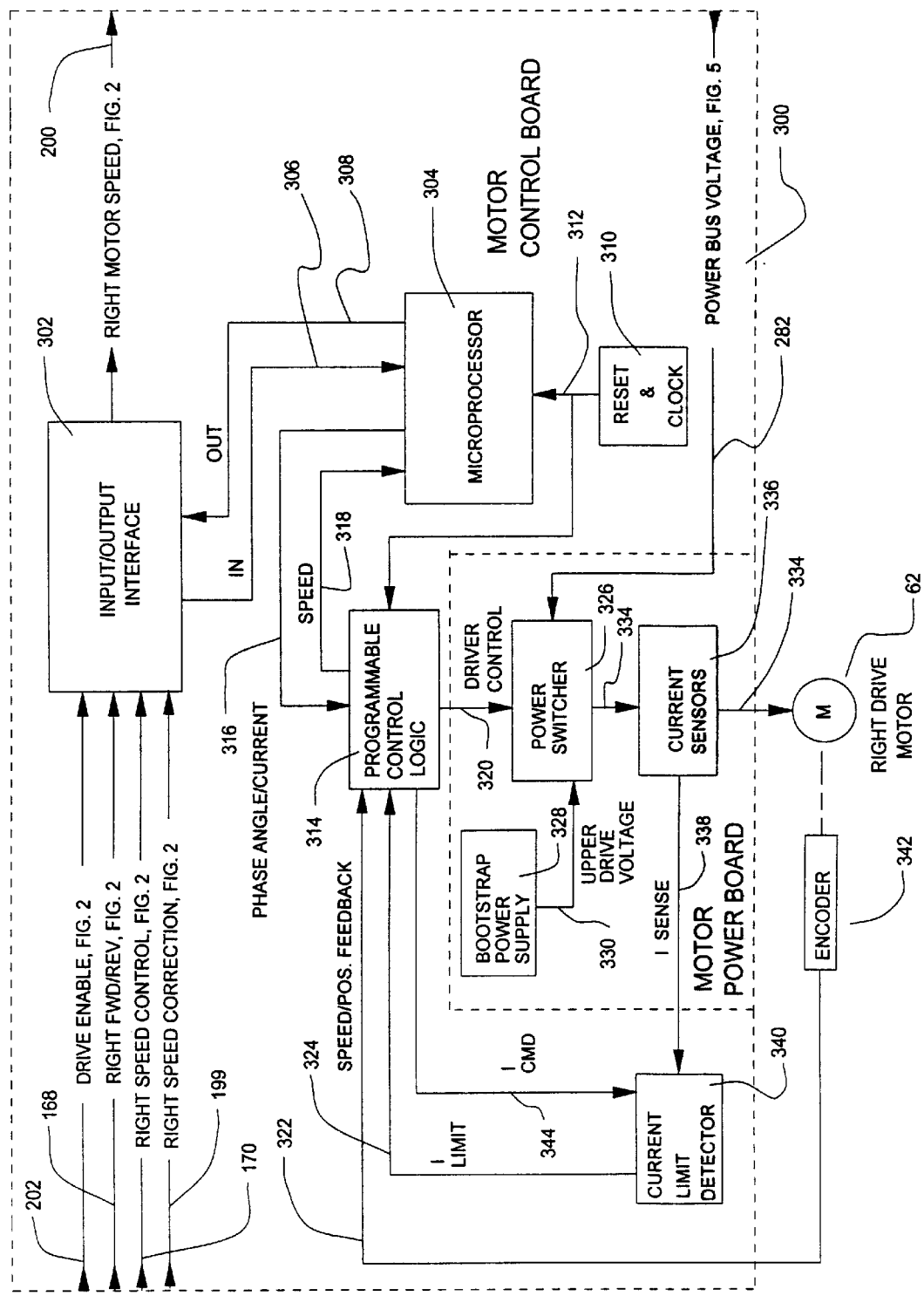
FIG. 4 is a block diagram of the right wheel drive control system.

FIG. 3 shows a block diagram of the left wheel drive control system 250 and FIG. 4 shows a block diagram of the right wheel drive control system 300. Due to the similarities in the drive control systems 250, 300, only the left wheel drive control system 250 will be discussed in detail. The components of the right wheel drive control system 300 are numbered separately using the numbers 300 through 344 to show that these are separate components.

The left forward/reverse signal 164, the left speed control signal 166, left speed correction signal 197 and the drive enable signal 202 are connected to the left motor control board input/output interface 252 which also provides an output for the left motor speed signal 198. The left motor control board interface 252 communicates with the left motor control board microprocessor 254 through left microprocessor input signals 256 and left microprocessor output signals 258.

In addition to the left microprocessor input signals 256 and left microprocessor 258 output signals, the left microprocessor 254 receives the left reset and clock signal 262 from the reset and clock 260, the left speed signal 268 from the left programmable control logic 264, and outputs the phase angle/current signal 266 to the programmable control logic 264. The programmable control logic 264 also utilizes the left reset and clock signal 262 and generates the left driver control signal 270 and left current command signal 294 in accordance with the left phase angle current signal 266, the left speed/position feedback signal 272, and the left current limit signal 274.

The left driver control signal 270 is used by the left power switcher 276 along with the power bus voltage signal 282 and the left upper drive voltage signal 280 to generate the left switcher signal 284. The left upper drive voltage signal 280 is generated by the left bootstrap power supply 278.

The left switcher signal 284 is monitored by the left current sensors 286 to generate the current sensing signal 288. The current sensing signal 288 is used by the left current limit detector 290 with the current command signal 294 to generate the current limit signal 274. The left switcher signal 284 is the sent to the left drive motor 60, which is monitored by the left encoder 292, which generates the speed/position feedback signal 272.

Figure 5:
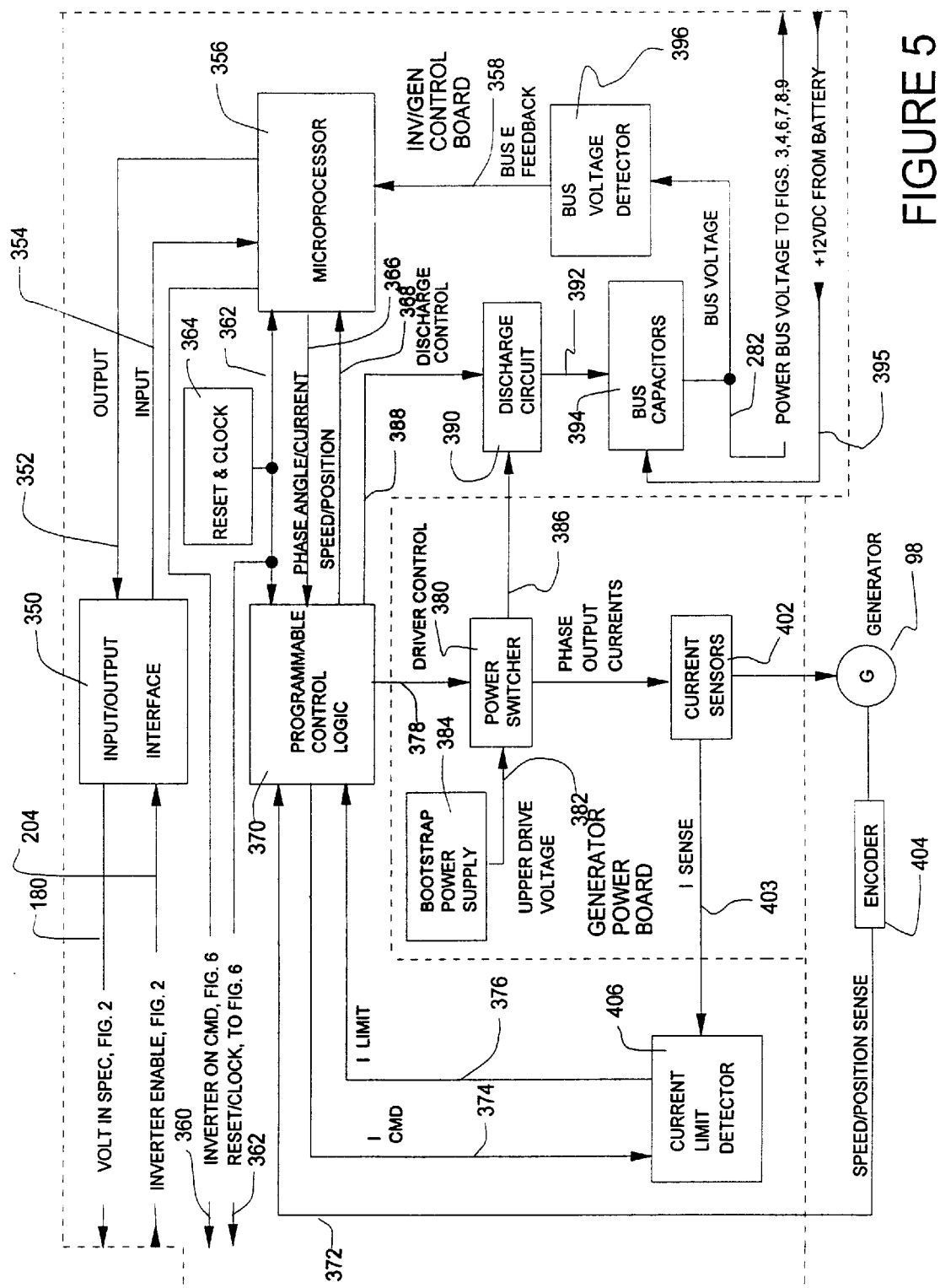
FIG. 5 is a block diagram of the control system for the generator that is mechanically driven by the internal combustion engine.

FIG. 5 shows a block diagram of the generator control system 348 for the generator 98 that is mechanically driven by the internal combustion engine 102. The voltage in specification signal 180 and inverter enable signal 204 are connected to the inverter/generator control board input/output interface 350. The inverter/generator control board interface 350 communicates with the inverter/generator control board microprocessor 356 through generator microprocessor input signals 354 and generator microprocessor output signals 352.

In addition to the generator microprocessor input signals 354, the generator microprocessor 356 receives the generator reset and clock signal 362 from the generator reset and clock 364, the generator speed/position signal 368 from the generator programmable control logic 370, the bus energy feedback signal 358 and outputs the phase angle/current signal 366 to the programmable control logic 370. The programmable control logic 370 also utilizes the generator reset and clock signal 362 and generates the generator driver control signal 378, discharge control signal 388 and generator current command signal 374 in accordance with the generator phase angle current signal 366, the generator speed/position feedback signal 372, and the generator current limit signal 376.

The generator driver control signal 378 is used by the generator power switcher 380 along with generator upper drive voltage signal 382 to generate the generator phase output current switcher signal 400 and the power discharge signal 386. The generator upper drive voltage signal 382 is generated by the generator bootstrap power supply 384.

The generator switcher signal 400 is monitored by the generator current sensors 402 to generate the current sensing signal 403. The current sensing signal 403 is used by the generator current limit detector 406 with the current command signal 374 to generate the current limit signal 376. The generator switcher signal 400 is sent to the generator 98, which is monitored by the generator encoder 404, which generates the speed/position feedback signal 372.

The power discharge signal 386 and the discharge control signal 388 are used by the discharge circuit 390 to generate the capacitor discharge signal 392 for the bus capacitors 394 which also use the battery signal 395 from the battery 396 to control the bus voltage signal 282. The bus voltage signal 282 is monitored by the bus voltage detector 396 to generate the bus energy feedback signal 358 used by the generator microprocessor 356.

Figure 6:
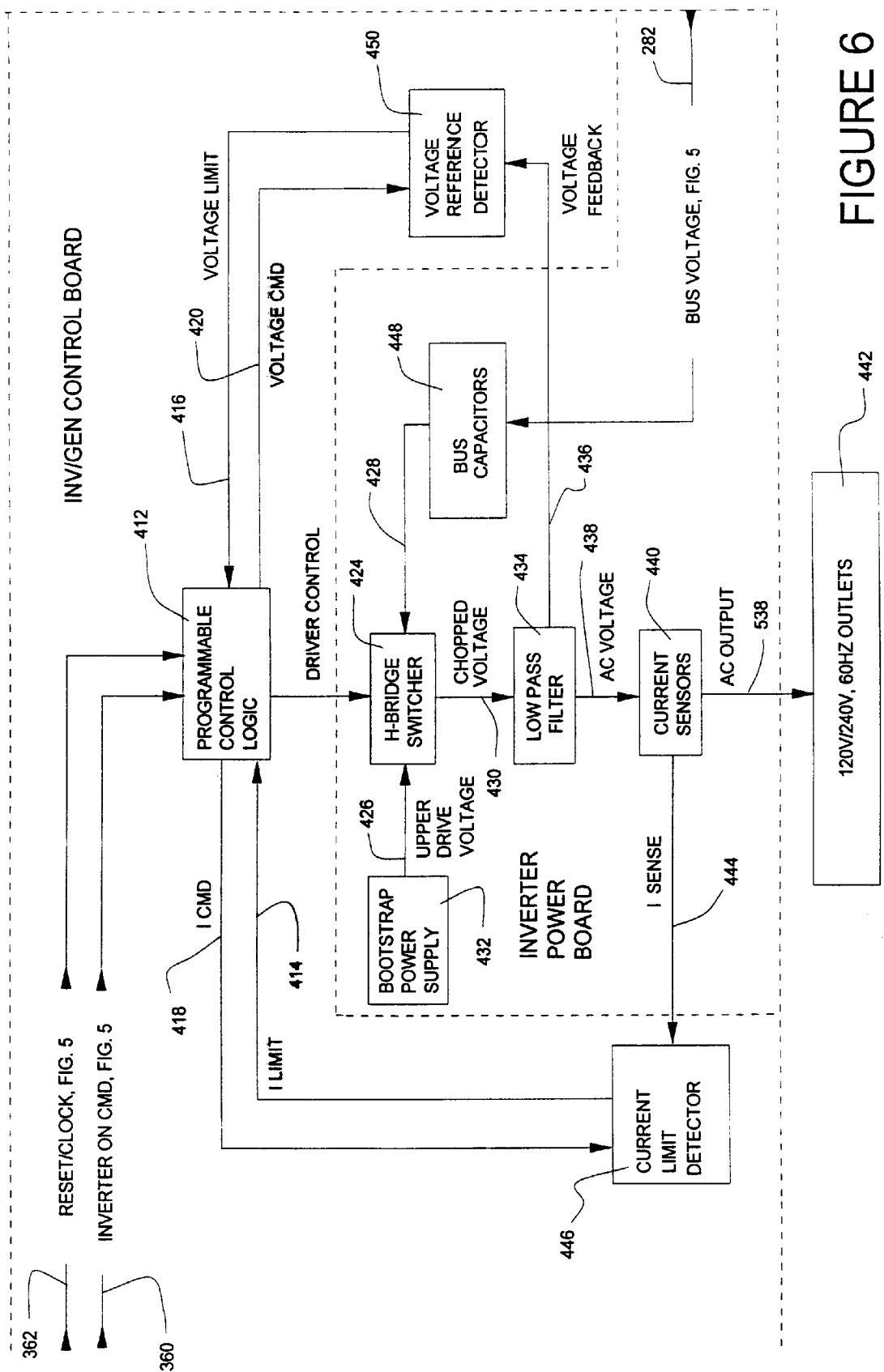
FIG. 6 is a block diagram of the inverter.

FIG. 6 shows a block diagram of the inverter generator control board 410 for the inverter 100. The inverter/generator control board receives the inverter on command and reset/clock signals from the microprocessor 356 of FIG. 5. The inverter programmable logic control 412 uses the inverter enable signal 360, the reset clock signal 362, voltage limit signal 416, and inverter current limit signal 414 to generate the inverter driver control signal 422, inverter voltage command signal 420 and inverter current command signal 418. The inverter driver control signal 422 is used by the H-bridge power switcher 424 to control the chopped inverter voltage 430 generated from the upper drive voltage 426 from an inverter bootstrap power supply 432 and the inverter bus capacitors voltage signal 428 from the inverter bus capacitors 448. The chopped inverter voltage 430 passes through the low pass filter 434 to generate the AC type voltage 438 and then passes into the inverter current sensors 440 to generate the low voltage AC Output 438 for the outlets 442. A current sensor signal 444 is sent to the inverter current limit detector 446 from the inverter current sensor 440. The current sensor signal 444 is used with the inverter current command signal 418 by the inverter current limit detector 446 to generate the inverter current limit signal 414. The inverter bus capacitors 448 are connected to the bus voltage 282.

The low pass filter 434 is also connected to provide an inverter voltage feedback signal 436 to the voltage reference detector 450. The voltage reference detector 450 uses the inverter voltage feedback signal 436 and the voltage command signal 420 to generate the voltage limit signal 446.

FIGS. 7 and 8 are block diagrams that show the drive control system 451 for the deck cutting blades 84, 86, 88. An operator interface device 150 such as a blade switch 452 is mounted on the mower 10 and provides the blade start signal 456. The blade start signal 456 is into the blade input/output interface 460 along with the blade enable signal 206. The blade input/output interface 460 communicates with the blade microprocessor 464 through a microprocessor input signal 461 and microprocessor output signal 462. The blade input/output interface also outputs the blades on signal 206 used by the master controller 48. The blade microprocessor 464 accepts the microprocessor input signal 461, the first blade speed/position signal 468, the second blade speed/position signal 472, the third blade speed/position signal 476, and the blade reset/clock signal 466. The blade microprocessor 464 uses these input signals to generate the microprocessor output signal 462, the first blade phase angle/current signal 470, the second blade phase angle/current signal 472, and the third blade phase angle/current signal 476.

The first blade programmable control logic 482 utilizes the first blade phase angle/current signal 470, the blade reset and clock signal 466, the first blade speed/position feedback signal 506 and the first blade current limit signal 502 to generate the first blade driver control signal 484, the first blade speed/position signal 468, and the first blade current command signal 498. The first blade driver control signal 484 is used by the first blade power switcher 486 along with the power bus voltage signal 282 and the first blade upper drive voltage signal 488 to generate the first blade switcher signal 492. The first blade upper drive voltage signal 488 is generated by the first blade bootstrap power supply 490.

The first blade switcher signal 492 is monitored by the first blade current sensors 494 to generate the first blade current sensing signal 496. The current sensing signal 496 is used by the first blade current limit detector 500 with the current command signal 498 to generate the first blade current limit signal 502. The first blade switcher signal 492 is sent to the first blade drive motor 80, which is the center blade drive motor in this embodiment. The first blade drive motor 80 is monitored by the first blade encoder 504 which generates the first blade speed/position feedback signal 506 used by the first blade programmable control logic 482.

The second blade programmable control logic 508 utilizes the second blade phase angle/current signal 474, the blade reset and clock signal 466, the second blade speed/position feedback signal 526 and the second blade current limit signal 528 to generate the second blade driver control signal 510, the second blade speed/position signal 472, and the second blade current command signal 530. The second blade driver control signal 510 is used by the second blade power switcher 512 along with the power bus voltage signal 282 and the second blade upper drive voltage signal 514 to generate the second blade switcher signal 518. The second blade upper drive voltage signal 514 is generated by the second blade bootstrap power supply 516.

The second blade switcher signal 518 is monitored by the second blade current sensors 520 to generate the second blade current sensing signal 522. The second blade current sensing signal 522 is used by the second blade current limit detector 524 with the second blade current command signal 530 to generate the second blade current limit signal 528. The second blade switcher signal 518 is sent to the second blade drive motor 78, which is the left blade drive motor in this embodiment. The second blade drive motor 78 is monitored by the second blade encoder 532 which generates the second blade speed/position feedback signal 526 used by the second blade programmable control logic 508.

The third blade programmable control logic 540 utilizes the third blade phase angle/current signal 478, the blade reset and clock signal 466, the third blade speed/position feedback signal 542 and the third blade current limit signal 544 to generate the third blade driver control signal 546, the third blade speed/position signal 476, and the third blade current command signal 548. The third blade driver control signal 546 is used by the third blade power switcher 550 along with the power bus voltage signal 282 and the third blade upper drive voltage signal 552 to generate the third blade switcher signal 556. The third blade upper drive voltage signal 552 is generated by the third blade bootstrap power supply 554.

The third blade switcher signal 556 is monitored by the third blade current sensors 558 to generate the third blade current sensing signal 560. The third blade current sensing signal 560 is used by the third blade current limit detector 562 with the third blade current command signal 548 to generate the third blade current limit signal 544. The third blade switcher signal 556 is sent to the third blade drive motor 82, which is the right blade drive motor in this embodiment. The third blade drive motor 82 is monitored by the third blade encoder 564 which generates the third blade speed/position feedback signal 542 used by the third blade programmable control logic 540.

FIG. 9 shows a block diagram of the deck tilt control system 569. An operator interface device 150 such as a tilt switch 570 is mounted on the mower 10 and provides the deck tilt command signal 576 and deck tilt down command signal 578. Sensors such as an upper tilt limit sensor 572, and a down limit sensor 574, provide the down limit signal 580 and the tilt limit signal 582.

The mowing deck 52 can be tilted for maintenance when the left driven wheel 44 and the right driven wheel 46 are not moving, the brake is on and the cutting blades 84, 86, 88 are not rotating. The tilting of the deck 52 is accomplished by placing the deck position switch 570 in the raise/tilt position. The motor 50 through the mechanical linkage 68 raises the deck 52 past the mechanical stops, which will start the tilting of the deck 52 to the desired angle. When the desired angle is reached, the deck position switch 570 should be returned to the off position to stop the tilting. The maximum tilt angle, at which the tilt limit switch 572 is activated, is 90 degrees. To lower the deck 52 so that the blades 84, 86, 88 can be operated, the deck position switch 570 is placed in the down position until the deck 52 passes the height stops. After the deck 52 reaches the stops and the height limit switch, the deck position switch can be used to adjust the cutting height of the blades 84, 86, 88. When the deck 52 is above the height high limit switch 573, the mower driven wheels and the cutting blades are prevented from operating. The cutting height of the deck 52 can be adjusted during mower operation between the height low limit switch 574 and the height high limit switch 573.

The deck tilt command signal 576, deck tilt down command signal 578, down limit signal 580, high limit signal 581, the tilt limit signal 582, and the deck tilt enable/inhibit signal 208 are input into the tilt input/output interface 584. The tilt input/output interface 584 communicates with the tilt microprocessor 586 through a microprocessor input signal 588 and microprocessor output signal 590. The tilt input/output interface 584 also outputs the deck-tilted signal 178 used by the master controller 48.

The tilt microprocessor 586 accepts the microprocessor input signal 588, the tilt speed/position signal 592, and the tilt reset/clock signal 596. The tilt microprocessor 586 uses these input signals to generate the microprocessor output signal 590 and the tilt phase angle/current signal 594. The tilt programmable control logic 600 utilizes the tilt phase angle/current signal 594, the tilt reset and clock signal 596, the tilt speed/position feedback signal 602 and the tilt current limit signal 604 to generate the tilt driver control signal 606, the tilt speed/position signal 592, and the tilt current command signal 608. The tilt driver control signal 606 is used by the tilt power switcher 610 along with the power bus voltage signal 282 and the tilt upper drive voltage signal 612 to generate the tilt switcher signal 616. The tilt upper drive voltage signal 612 is generated by the tilt bootstrap power supply 614.

The tilt switcher signal 616 is monitored by the tilt current sensors 618 to generate the tilt current sensing signal 620. The tilt current sensing signal 620 is used by the tilt current limit detector 622 with the current command signal 608 to generate the tilt current limit signal 604. The tilt switcher signal 616 is the sent to the tilt drive motor 50 which is monitored by the tilt encoder 624 which generates the tilt speed/position feedback signal 602 used by the tilt programmable control logic 600.

The scope of this invention is defined by the accompanying claims and not necessarily by specific features of the exemplary embodiments that have been described. Thus, although there have been described particular embodiments of the present invention of a new and useful Electric Riding Lawn Mower Powered by an Internal Combustion Engine and Generator System, it is not intended that such references be construed as limitations upon the scope of this invention except as set forth in the following claims.

What is claimed is:

1. A riding lawn mower, comprising:
    a fuel combustion engine;
    an electrical generator operatively connected to the fuel combustion engine;
    a first electric drive motor electrically connected to the electric generator and adapted to propel the riding lawn mower;
    a controller adapted to generate an inverter control signal to control the frequency and output voltage level of the inverter; and
    an electrical signal inverter electrically connected to the electrical generator and adapted to receive the inverter control signal and generate a power output.

2. The riding lawn mower of claim 1, the electrical signal inverter comprising:
    a programmable logic device adapted to receive the inverter control signal and generate pulses according to the inverter control signal by varying the pulse width and frequency of pulses;
    an h-bridge for converting the pulses to a waveform; and
    a smoothing low pass filter adapted to smooth the waveform to produce the power output.

3. A riding lawn mower, comprising:
    a fuel combustion engine;
    an electrical generator operatively connected to the fuel combustion engine;
    a first electric drive motor electrically connected to the electric generator and adapted to propel the riding lawn mower; and
    support feet adapted to be placed in an up position and a down position, wherein when the support feet are in the down position the generator is supported by the support feet.

4. The riding lawn mower of claim 3, further comprising an electrical disconnect electrically connected between the generator and the drive motor and adapted to removably connect the generator and the drive motor.

5. The riding lawn mower of claim 3, comprising
    an electrical signal inverter electrically connected to the electrical generator, wherein the inverter is adapted to be operated as a stand-alone power source after the support feet have been placed in the down position.

6. A riding lawn mower, comprising:
a fuel combustion engine;
an electrical generator operatively connected to the fuel combustion engine;
a first electric drive motor electrically connected to the electric generator and adapted to propel the riding lawn mower;
a first driven wheel mechanically coupled to the first drive motor;
an operator interface device adapted to generate an input signal;
a driven wheel controller electrically connected to the operator interface device and adapted to receive the input signal and generate a first motor control signal;
a first drive motor controller electrically connected to the first drive motor and the driven wheel controller and adapted to receive the first motor control signal, the first drive motor controller further adapted to control the speed of the first driven wheel in accordance with the first motor control signal;
a second driven wheel adapted to drive the mower;
a second drive motor adapted to drive the second driven wheel;
the driven wheel controller further adapted to generate a second motor control signal; and
a second drive motor controller electrically connected to the second drive motor and the driven wheel controller and adapted to receive the second motor control signal, the second drive motor controller further adapted to control the speed of the second driven wheel in accordance with the second motor control signal.

7. The riding lawn mower of claim 6, the driven wheel controller further adapted to generate the second motor control signal independently of the first motor control signal.

8. A riding lawn mower, comprising:
a fuel combustion engine;
an electrical generator operatively connected to the fuel combustion engine;
a first electric drive motor electrically connected to the electric generator and adapted to propel the riding lawn mower;
a mowing deck adapted to support the cutting blades;
a drive frame adapted to support the drive motor;
a tilting motor attached to the drive section and mechanically coupled to the mowing deck for tilting of the mowing deck;
an operator interface device adapted to generate a tilting signal; and
a tilting motor controller adapted to control the operation of the tilting motor in accordance with the tilting signal.

9. The riding lawn mower of claim 8, further comprising:
a chain/sprocket drive attached to the tilting motor and the mowing deck and adapted to mechanically couple the tilting motor to the mowing deck.

10. The riding lawn mower of claim 8, wherein the tilting motor is only operable when the cutting blades are not energized.

11. A riding lawn mower, comprising:
a drive motor controller adapted to operate a drive motor in accordance with a drive enable signal and generate a speed signal during operation of the drive motor;
a tilting motor controller adapted to operate a tilt motor in accordance with a tilt enable signal and detect a mowing deck in a tilted position and generate a deck tilted signal; and
a master controller adapted to receive the speed signal and the deck tilted signal and selectively enable the drive motor controller by generating the drive enable signal in the absence of the deck tilted signal, and selectively enable the tilting motor controller by generating the tilt enable signal in the absence of the speed signal.

12. A riding lawn mower, comprising:
a blade motor controller adapted to operate a blade motor in accordance with a blade enable signal and generate a blade inhibit signal during operation of the blade motor;
a tilting motor controller adapted to detect a mowing deck in a tilted position and generate a deck tilted signal; and
a master controller adapted to receive the blade inhibit signal and the deck tilted signal and selectively enable the blade motor controller in the absence of the deck tilted signal and selectively enable the tilting motor controller in the absence of the blade inhibit signal.

13. A riding lawn mower, comprising:
a drive motor operated in accordance with a drive enable signal, the drive motor coupled to at least one drive wheel;
a blade motor operated in accordance with a blade enable signal, the blade motor coupled to a cutting blade;
a master controller adapted to control and co-ordinate the drive motor and the blade motor by generating the drive enable signal and a blade enable signal; and
an inverter integrated into the master controller, said inverter operated in accordance with an inverter enable signal, wherein the master controller is further adapted to control and co-ordinate the inverter by generating the inverter enable signal.

14. A riding lawn mower, comprising:
a drive motor operated in accordance with a drive enable signal, the drive motor coupled to at least one drive wheel;
a blade motor operated in accordance with a blade enable signal, the blade motor coupled to a cutting blade;
a master controller adapted to control and co-ordinate the drive motor and the blade motor by generating the drive enable signal and a blade enable signal; and
an inverter operated in accordance with an inverter enable signal, wherein the master controller is further adapted to control and co-ordinate the inverter by generating the inverter enable signal.

15. A riding lawn mower, comprising:
a drive motor operated in accordance with a drive enable signal, the drive motors coupled to at least one drive wheel;
a blade motor operated in accordance with a blade enable signal, the blade motor coupled to a cutting blade;
a master controller adapted to control and co-ordinate the drive motor and the blade motor by generating the drive enable signal and a blade enable signal; and
a tilt motor operated in accordance with a tilt enable signal, wherein the master controller is further adapted to control and co-ordinate the tilt motor by generating the tilt enable signal.

16. An electric riding mower, comprising:
a generator section including an electric generator mechanically driven by an internal combustion engine, the electric generator adapted to generate electrical power;
a drive section including an electric drive motor driving a wheel;

a mowing section including an electric motor driving a cutting blade;

a power output to standard electric utility low voltage AC outlet plugs; and an inverter electrically connected to the electrical generator and adapted to convert the electrical power to said power output.

17. An electric riding mower, comprising:

a generator section including an electric generator mechanically driven by an internal combustion engine, the electric generator adapted to generate electrical power;

a drive section including an electric drive motor driving a wheel;

a mowing section including an electric motor driving a cutting blade; and a tilting motor attached to the drive section and mechanically coupled to the mowing section, the tilting motor adapted to raise and lower the mowing section.

18. An electric riding mower, comprising:

a generator section including an electric generator mechanically driven by an internal combustion engine, the electric generator adapted to generate electrical power;

a drive section including an electric drive motor driving a wheel;

a mowing section including an electric motor driving a cutting blade; and a generator controller adapted to control the output of the generator as an integral part of the mower or as a stand-alone power source.

19. An electric riding mower control system, comprising:

an operator interface device adapted to generate a speed input signal;

a generator controller adapted to control the output of a generator;

a first drive wheel controller adapted to control the speed and torque of a first drive motor;

a tilting drive controller adapted to control the speed and torque of a tilting motor;

a cutting blade controller adapted to control the speed and torque of a blade motor;

a master controller adapted to communicate with each of the controllers for the motors and process the data necessary to co-ordinate the operation of the motors.

20. The electric riding mower control system of claim 19, further comprising:

a second drive wheel controller adapted to control the speed and torque of a second drive motor;

wherein the master controller is adapted to provide independent control of each wheel drive controller to allow the mower to make zero radius turns.

* * * * *